United States Patent
Bodecker et al.

(10) Patent No.: US 11,466,719 B2
(45) Date of Patent: Oct. 11, 2022

(54) CAP FOR TEMPORARY FASTENER

(71) Applicant: SPIRIT AEROSYSTEMS, INC., Wichita, KS (US)

(72) Inventors: Jeremy Michael Bodecker, Wichita, KS (US); Jennifer Lyn Wilson, Wichita, KS (US); Rodney Eugene Bahr, Wichita, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 193 days.

(21) Appl. No.: 16/722,150

(22) Filed: Dec. 20, 2019

(65) Prior Publication Data
US 2021/0190116 A1   Jun. 24, 2021

(51) Int. Cl.
| F16B 37/12 | (2006.01) |
| F16B 19/10 | (2006.01) |
| B21J 15/42 | (2006.01) |
| F16B 5/04  | (2006.01) |
| B33Y 80/00 | (2015.01) |

(52) U.S. Cl.
CPC .............. *F16B 19/109* (2013.01); *B21J 15/42* (2013.01); *F16B 5/04* (2013.01); *B33Y 80/00* (2014.12)

(58) Field of Classification Search
CPC .............................. F16B 19/109; B25B 31/005
USPC ....................................................... 411/372.5
See application file for complete search history.

(56) References Cited

U.S. PATENT DOCUMENTS

| 3,233,504 | A | * | 2/1966 | Jones | B25B 31/005 269/48.3 |
| 3,263,320 | A | * | 8/1966 | Jones | B25B 31/005 29/466 |
| 3,331,268 | A | * | 7/1967 | Jones | B25B 21/002 81/55 |
| 4,459,728 | A | * | 7/1984 | Gaquere | B25B 31/005 29/243.523 |
| 4,548,533 | A | * | 10/1985 | Pratt | F16B 19/109 24/607 |
| 4,787,274 | A | * | 11/1988 | Belanger | B25B 31/005 81/57.15 |
| 4,936,726 | A | * | 6/1990 | Medard | B21J 15/04 411/44 |
| 5,527,023 | A | * | 6/1996 | Starr | B23Q 3/186 279/2.17 |
| 8,171,690 | B2 | * | 5/2012 | Ghatikar | E04F 13/0837 52/506.05 |
| 8,191,224 | B2 | * | 6/2012 | Richards | F16B 35/06 29/509 |
| 8,366,367 | B2 | * | 2/2013 | Matlock | F16B 37/14 411/429 |
| 9,290,276 | B2 | * | 3/2016 | Watanabe | F16B 37/14 |
| 9,939,006 | B2 | * | 4/2018 | Song | B64D 37/06 |
| 10,578,146 | B2 | * | 3/2020 | Etling | F16B 33/004 |

(Continued)

*Primary Examiner* — Gary W Estremsky
(74) *Attorney, Agent, or Firm* — Hovey Williams LLP (57) ABSTRACT

A cap for a temporary fastener comprises a hollow, cup-shaped body and an inwardly tapered neck. The hollow body fits over a workpiece-engaging portion of the temporary fastener, and the neck extends from the hollow body. The tapered neck terminates in a hollow tip that is sized and configured to fit over aligned holes in the joined workpieces and to contact a minimal surface area of the outermost workpiece to reduce surface damage to the workpieces such that any damage will be removed when the holes are countersunk in the normal course of assembly.

9 Claims, 6 Drawing Sheets

(56) References Cited

U.S. PATENT DOCUMENTS

| | | | |
|---|---|---|---|
| 10,920,815 B2* | 2/2021 | Niklewicz | B25B 31/005 |
| 2003/0170072 A1* | 9/2003 | Gordon | F16B 11/006 |
| | | | 403/266 |
| 2011/0226896 A1* | 9/2011 | Bessho | F16B 37/145 |
| | | | 244/1 A |
| 2014/0086677 A1* | 3/2014 | Parsell, Jr. | B64C 27/006 |
| | | | 403/327 |
| 2020/0290180 A1* | 9/2020 | Palette | B25B 31/005 |

* cited by examiner

CAP FOR TEMPORARY FASTENER

BACKGROUND

The present invention relates to temporary fasteners, and more particularly, to caps for such fasteners.

Temporary fasteners, such as Cleco-type fasteners, are often used to fasten two or more pieces of material (workpieces) together as they are being assembled and/or otherwise worked upon. For example, such fasteners are widely used in the manufacture and repair of aluminum-skinned aircraft to temporarily fasten aircraft skin panels together and/or attach the skin panels to stiffeners, frames, etc. before these components are more permanently joined.

Temporary fasteners are typically installed in aligned holes drilled through the workpieces they attach and expand on the far side of the workpieces to draw and clamp them together while maintaining their alignment and preventing distortion. Temporary-type fasteners are "blind" fasteners—they can be installed from one side (typically the exterior) of an aircraft or other assembly—and can be removed and reinstalled as permanent fasteners (rivets, screws, etc.) are installed. Once enough permanent fasteners have been installed, the last temporary fasteners may be removed and replaced with other permanent fasteners.

A conventional temporary fastener consists of a cylindrical body, a plunger on top the cylindrical body, a spring inside the cylindrical body, a pair of step-out locks with locking jaws extending out the bottom of the cylindrical body, and a spreader bar between the locking jaws. A special type of pliers are used to depress the spring-loaded plunger, which pushes the step-out locks out the bottom of the cylindrical body, allowing the locking jaws to come together below the spreader bar. The locking jaws may then be slipped through aligned holes in two or more workpieces. The plunger is then released so the spring pulls the step-out locks and locking jaws up towards the spreader bar, which pushes the two jaws out to engage the inside surfaces of the workpieces. This squeezes the workpieces together between the locking jaws and the cylindrical body while maintaining the alignment between the holes in the workpieces.

Unfortunately, temporary-type fasteners can scratch, gouge, or otherwise damage the exterior surfaces of the workpieces they join. Aircraft skin panels are often sprayed with temporary protective coatings (TPCs) to protect the skin panels during aircraft fabrication, assembly, and shipment. Because temporary-type fasteners squeeze the skin panels together, they often leave scratches, gouges, and/or elevated rings in the TPCs when removed, and such damage can transfer to the exterior surfaces of the skin panels even after the TPCs are removed, necessitating costly and time-consuming smoothing of the skin panels before they are painted. This is exasperated by the tendency of TPCs to become brittle when exposed to low temperatures and soft when exposed to high temperatures. Caps that fit over temporary fasteners are often used to reduce slippage of the fasteners, but such caps do little to alleviate the above-described TPC damage problems.

SUMMARY

The present invention solves the above-described problems and provides a distinct advance in the art of temporary fasteners by providing an improved fastener cap that eliminates most damage to aircraft panels or other workpieces caused by temporary fasteners. More particularly, embodiments of the cap are configured to significantly reduce damage to TPCs caused by temporary fasteners and to isolate any such damage to portions of the TPCs that will be removed in the normal course of assembly.

A fastener cap constructed in accordance with a first embodiment of the invention broadly comprises a hollow, cup-shaped body and an inwardly tapered neck. The hollow body fits over the workpiece-engaging portion of a temporary fastener. The neck extends from the hollow body and engages the exterior surface of the outermost workpiece to be attached by the fastener. The tapered neck terminates in a small hollow tip sized and configured to fit over the aligned holes in the workpieces to be joined. Because of its reduced diameter, the tip contacts a minimal surface area of the outermost workpiece and thus limits damage to the TPCs to a small area surrounding the hole in the outermost workpiece. This small damaged area of the TPC is then removed when the hole is countersunk in the normal course of skin panel assembly. If the fastener is placed back in the countersunk hole, the cap fits within the confines of the countersunk hole and does no further damage to the TPCs.

A typical workpiece fastening procedure in which caps of the present invention may be used may proceed as follows: First, aligned straight holes may be drilled in two or more aircraft skin panels or other workpieces to be joined. A cap is then placed over a temporary fastener, and the fastener and cap are placed over the aligned holes. The plunger of the fastener is then manipulated by a plier to insert the locking jaws of the fastener in the aligned holes. The plier then releases the plunger to pull the locking jaws against the backside of one of the workpieces to temporarily squeeze and fasten the workpieces together. The tip of the cap only contacts a small surface area around the outermost fastener hole and thus does little damage to the TPCs around the hole. The temporary fastener may be subsequently removed to make room for a rivet or other permanent fastener and/or may be reattached as the workpieces are further worked upon. The straight hole in the outermost workpiece is eventually countersunk to accommodate the head of a rivet or other permanent fastener. The outside diameter of the tip of the cap is less than the outside diameter of the countersunk hole. Thus, any damage to the TPCs that was caused by the cap before the hole was countersunk is removed when the countersunk hole is drilled. If the fastener and cap are reattached to the workpieces after the countersunk hole is drilled, the tip of the cap fits within the confines of the countersunk hole and touches none of the TPCs on the exterior surface of the workpiece and therefore causes no additional damage to the TPCs. Additional steps in exemplary workpiece fastening procedures are described in the Detailed Description below.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figures 1, 2:
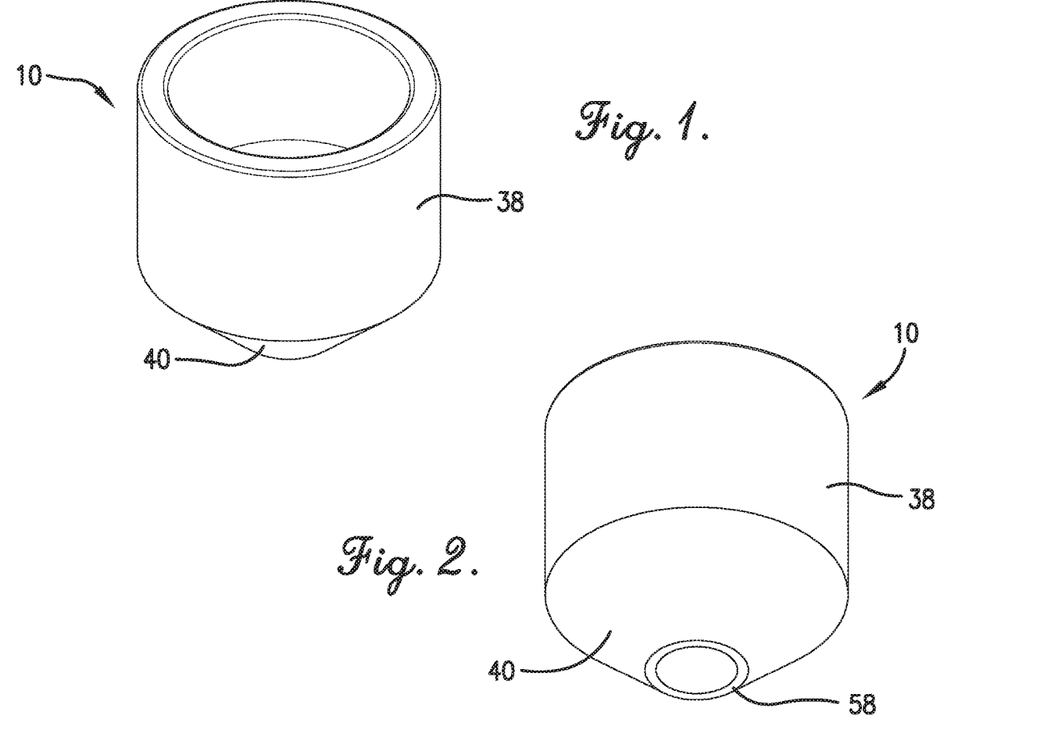
FIG. 1 is a top perspective view of a temporary fastener cap constructed in accordance with a first embodiment of the present invention.
FIG. 2 is a bottom perspective view of the cap of FIG. 1.
Figure 3:
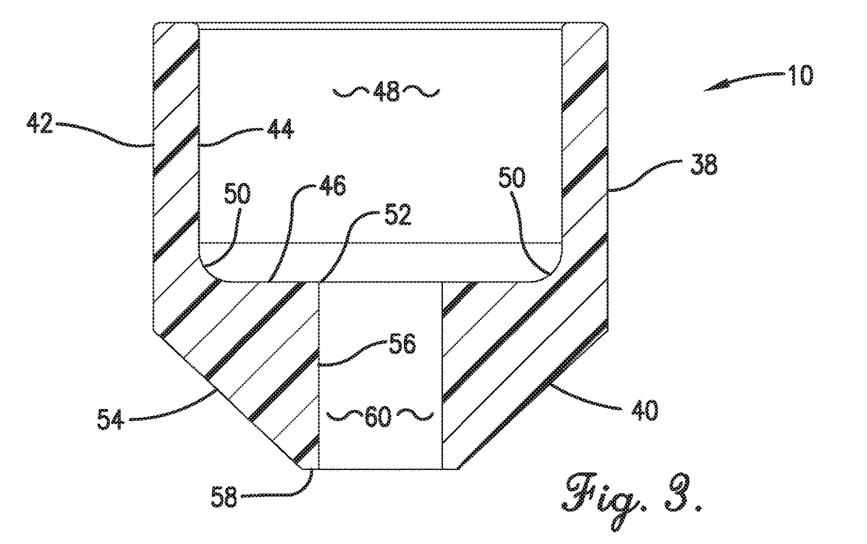
FIG. 3 is a vertical cross-sectional view of the cap of FIG. 1.
Figures 4, 5:
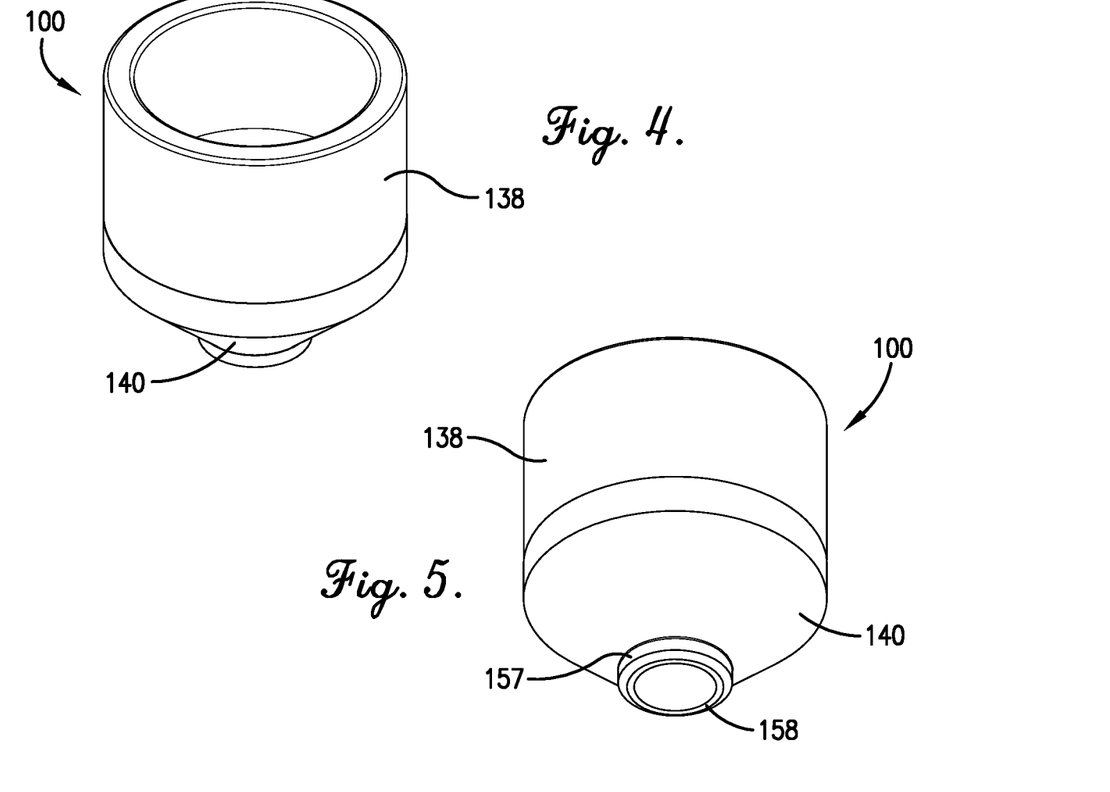
FIG. 4 is a top perspective view of a temporary fastener cap constructed in accordance with a second embodiment of the present invention.
FIG. 5 is a bottom perspective view of the cap of FIG. 4.
Figure 6:
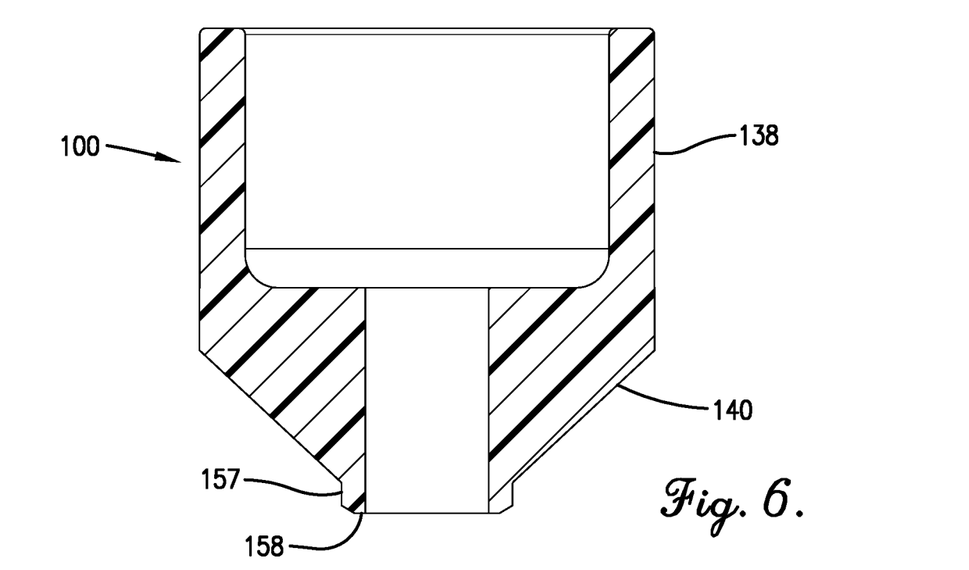
FIG. 6 is a vertical cross-sectional view of the cap of FIG. 4.
Figure 7:
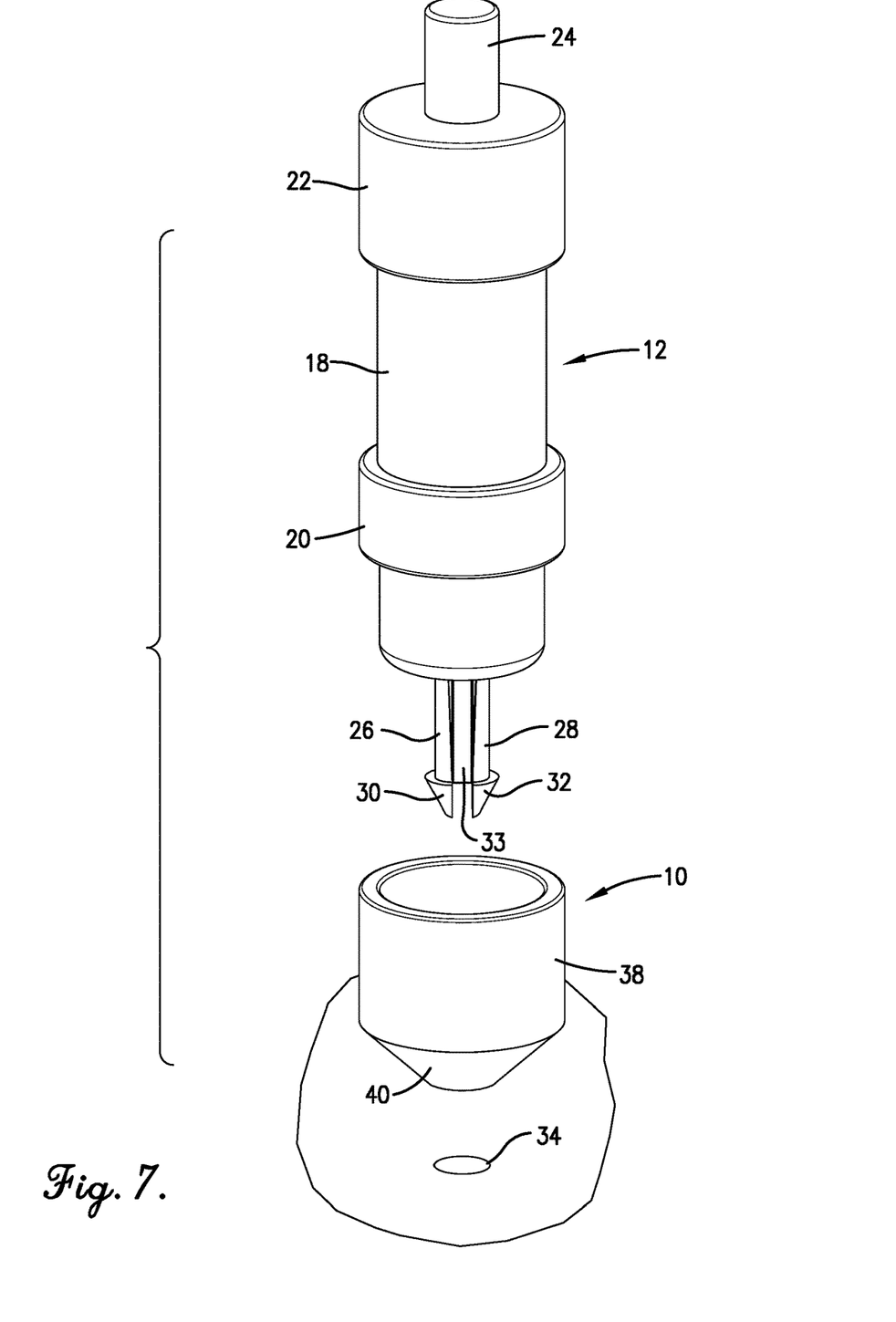
FIG. 7 is an exploded perspective view of the cap of FIG. 1 being installed on a temporary fastener and placed over a straight hole in a workpiece.
Figure 8:
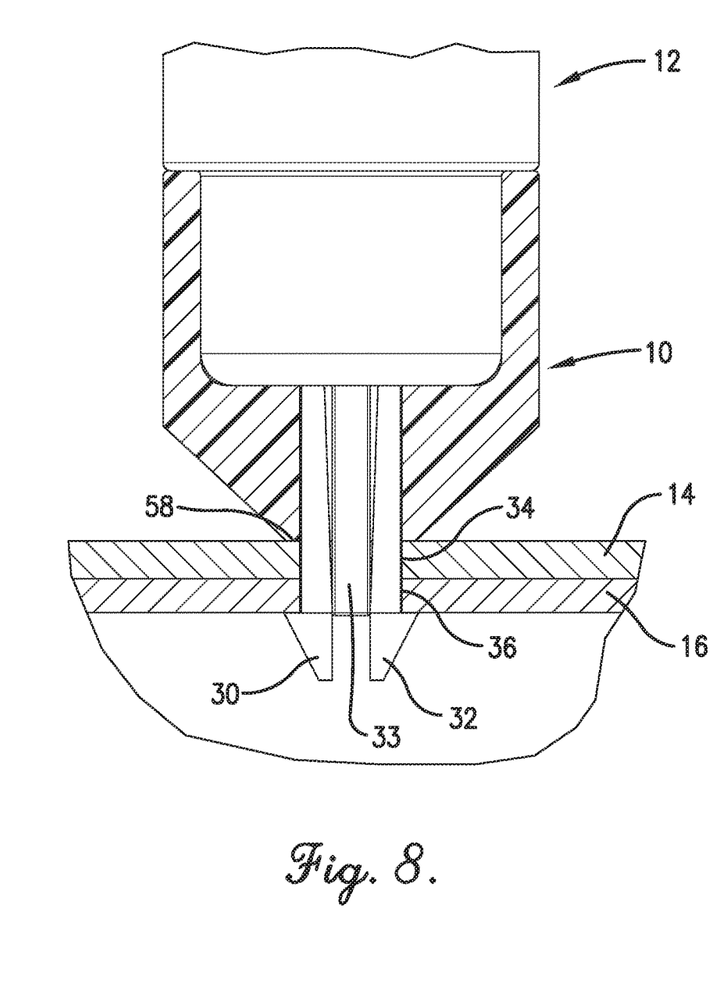
FIG. 8 is a fragmentary vertical sectional view of the cap of FIG. 1 installed on a temporary fastener that has been inserted in aligned holes in two workpieces.

Turning now to the drawing figures, and initially FIGS. 1-3, a cap 10 constructed in accordance with a first embodiment of the invention is illustrated. As shown in FIGS. 7 and 8, the cap 10 may be attached to a temporary fastener 12 configured to temporarily join two or more workpieces 14, 16 together. This particular embodiment of the cap 10 is especially configured for use with workpieces in which 100 degree flush shear head type rivet holes (for e.g., NAS1097 rivets) commonly used on certain aircrafts are drilled. Other embodiments of the cap, including the one shown in FIGS. 4-6 and 12, may be configured for other types and sizes of rivet holes and other holes, as the principles of the present invention are not limited to any particular size or type of rivets or rivet holes.

In one particular embodiment, the fastener 12 may be a Cleco-type fastener and the workpieces 14, 16 may be aircraft skin panels. A typical Cleco-type fastener is shown in FIG. 7 and comprises a partially hollow cylindrical body 18 with plier-engaging collars 20, 22; a plunger 24 extending from the top the cylindrical body; a spring (not shown) inside the cylindrical body; a pair of step-out locks 26, 28 with locking jaws 30, 32 extending out the bottom of the cylindrical body; and a spreader bar 33 between the step-out locks. As best shown in FIG. 8, the fastener 12 may be installed in aligned holes 34, 36 drilled through the aircraft skin panels 14, 16 and expanded on the far side of the skin panels to draw and clamp them together while maintaining their alignment while other assembly tasks are performed.

Returning to FIGS. 1-3, the cap 10 broadly comprises a hollow, cup-shaped body 38 and an inwardly tapered neck 40. The cap may be formed of any suitable materials such as acrylonitrile butadiene styrene (ABS) or other thermoplastic polymers. In one particular embodiment, the cap is formed of glass-filled nylon materials via injection molding, three-dimensional printing, or other manufacturing techniques.

The hollow body 38 fits over the lower end of the fastener 12, and in one embodiment, is cylindrical in shape. Referring to FIG. 3, the body 38 includes an outer wall 42, an inner wall 44, and a floor 46 that together define an internal cavity 48 sized and configured to fit over the lower end of the cylindrical body of the temporary fastener. In one embodiment, the outer wall is approximately 0.475 inches tall and has an outside diameter of approximately 0.7 inches. The inner wall 44 is approximately 0.4 inches tall and is joined to the lower wall 46 by a curved section 50. The inside diameter of the inner wall 44 is approximately 0.56 inches, which is equal to or slightly greater than the outside diameter of the end of the cylindrical body so that the cap fits snugly on the cylindrical body. The floor 46 includes a central through-hole 52 that is coaxial with, but smaller in diameter than, the internal cavity 48.

The tapered neck 40 extends from the hollow body 38 and is sized and configured to fit over the aligned holes 34, 36 in the workpieces 14, 16. As described in more detail below, the tapered neck 40 minimizes surface contact with the exterior surface of the workpiece 14 to eliminate or at least reduce damage to the TPCs on the workpiece.

Referring to FIG. 3, the tapered neck 40 includes an inwardly angled outer wall 54, an inner wall 56, and an annular tip 58. The outer wall 54 slopes inwardly at an angle of 40°-50° relative to the outer wall 42 of the hollow body. In one embodiment, the outer wall tapers inwardly at an angle of approximately 47°, which is approximately the same as the taper angle of a countersunk hole for a 100 degree flush shear head rivet. As explained in more detail below, this permits the annular tip 58 and lowermost portion of the outer wall 54 to mate with and fit within the confines of the countersunk hole without contacting any exterior surfaces of the workpiece 14 outside the countersunk hole.

The inner wall 56 is straight and defines a hollow passageway 60 that connects the internal cavity 48 to the tip 58. The passageway 60 is coaxial with the internal cavity 48 and is the same diameter as the through hole 52 in the floor 46 of the hollow body. As described below, the hole 52 and passageway 60 permit passage of the step-out locks 26, 28 and spreader bar 34 of the fastener 12 through the cap 10.

Figure 11:
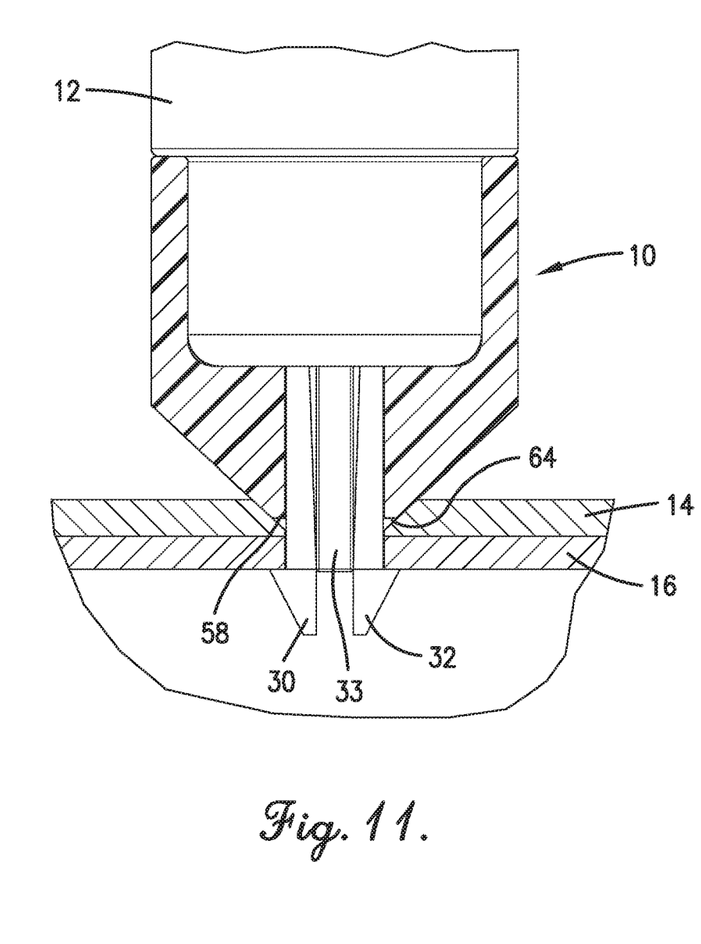
FIG. 11 is a fragmentary vertical sectional view of the cap of FIG. 1 installed on a temporary fastener that has been inserted in aligned holes in two workpieces after the hole in the outer workpiece has been countersunk.

The annular tip 58 is the lowermost portion of the cap 10. The tip extends between the lowermost portions of the outer wall 54 and the inner wall 56 and is perpendicular relative to the axis of the cavity 48 and passageway 60. The tip 58 is sized and configured to occupy a minimum surface area on the workpiece 14 and is no greater than 0.5 inches in diameter. In one embodiment, the tip has an outside diameter of 0.24 inches and an inside diameter of 0.19 inches, and thus is only 0.05 inches wide. As shown in FIG. 8 and explained in more detail below, the tip 58 fits over and slightly overlaps the straight hole 34 in the outermost workpiece 14, and is shown in FIG. 11, mates with and fits within the confines of a countersunk hole in the workpiece.

A typical workpiece fastening procedure in which the cap 10 may be used may proceed as follows. First, the aligned straight holes 34, 36 may be drilled in the workpieces 14, 16. Similar holes may also be drilled in other portions of the workpieces 14, 16 and in corresponding stringers, underlying support structure, etc. The holes 34, 36 may be sized to accommodate the shafts of rivets or other fasteners, and in one embodiment, are 0.128 inches in diameter. When the workpieces are aircraft skin panels, the holes are preferably back-drilled from the inside surfaces of the skin panels.

The cap 10 is then placed over the lower end of the temporary fastener 12, and the fastener 12 and cap 10 are placed over the aligned holes 34, 36. The plunger of the fastener is then manipulated by a plier to insert the locking jaws 30, 32 in the aligned holes. The plier then releases the plunger to pull the locking jaws 30, 32 against the backsides of the workpieces 14, 16 to squeeze and fasten the workpieces together.

As shown in FIG. 8, the tip 58 is the only part of the cap 10 that touches the outermost workpiece 14. Because the neck 40 tapers inwardly relative to the cap body 38, and because the tip 58 is only approximately 0.05 inches wide, the tip 58 only contacts a small surface area around the outermost fastener hole 34 and thus does little damage to the TPCs around the hole.

As additional holes are drilled, the above-described steps may be repeated with additional fasteners and caps to secure the workpieces and control gapping between the workpieces and support structure.

Figure 10:
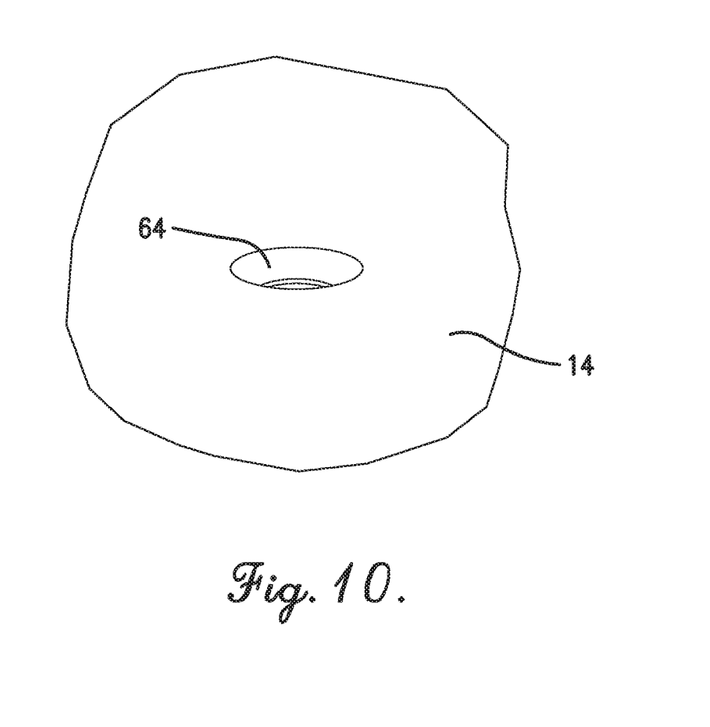
FIG. 10 is a perspective view of the hole in FIG. 9 after it has been countersunk to remove the damage to the TPC.

Once a sufficient number of holes have been drilled and connected with temporary fasteners, the holes may be enlarged and countersunk from the front side of the workpieces. FIG. 10 depicts a countersunk hole 64 in the outermost workpiece 14. As the holes are enlarged and countersunk, the fasteners may be removed from the smaller holes and repositioned to adjacent enlarged and countersunk holes so the smaller holes may be enlarged and countersunk.

Figure 9:
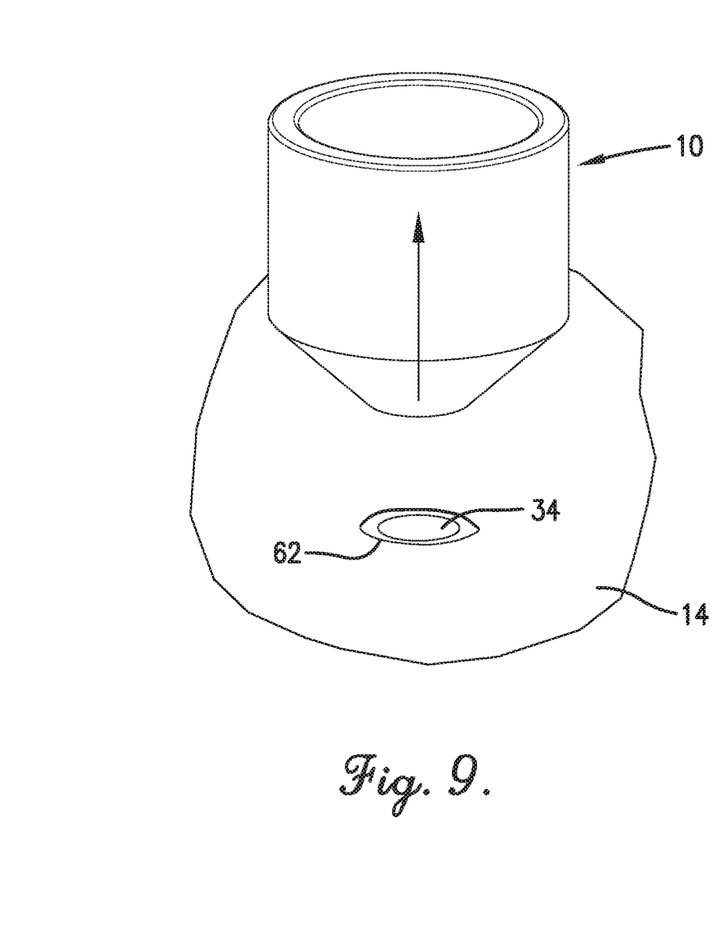
FIG. 9 is a perspective view that depicts the damage to TPC on a workpiece after the cap of FIG. 1 and its associated temporary fastener have been removed from a hole in the workpiece.

As a temporary fastener 12 is placed in and removed from the smaller non-countersunk holes 34, 36, the annular tip 58 of the cap engages the exterior surface of the outermost workpiece 14 as depicted in FIG. 8 and may damage the TPCs on the workpiece in the vicinity of the holes. FIG. 9 illustrates exemplary TPC damage 62 around the hole 34. Because the outside diameter of the tip 58 is only slightly greater than the outside diameter of the straight hole 34, the damaged portion of the TPCs 62 is confined to the area immediately surrounding the straight hole 34. FIG. 10 shows the hole after it has been countersunk (now labeled 64). Because the outside diameter of the tip 58 is less than the largest inside diameter of the countersunk hole 64, the damage to the TPCs 62 that was caused by the cap 10 is removed when the countersunk hole 64 is drilled. When the fastener 12 and cap 10 are reattached to the workpieces 14, 16 after the countersunk hole 64 is drilled, the cap 10 fits within the confines of the countersunk hole 64 as depicted in FIG. 11. Thus, the cap 10 no longer touches the exterior surface of the workpiece 14 and therefore causes no additional damage to the TPCs on the workpiece 14.

After all holes have been drilled and countersunk, the temporary fasteners 12 may be removed so that the assembly formed by the workpieces 14, 16 may be disassembled, deburred, and cleaned. Other assembly steps may also be performed such as applying sealant to the workpieces.

The workpieces 14, 16 are then re-positioned and reattached by again inserting the fasteners 12 with caps 10 in the aligned holes. Temporary fasteners are typically installed every 8-10 inches along the fastener holes to keep the assembly tight. Once the workpieces are secured, rivets or other permanent fasteners are inserted through the empty holes. The temporary fasteners are then removed and replaced with permeant fasteners.

Figure 12:
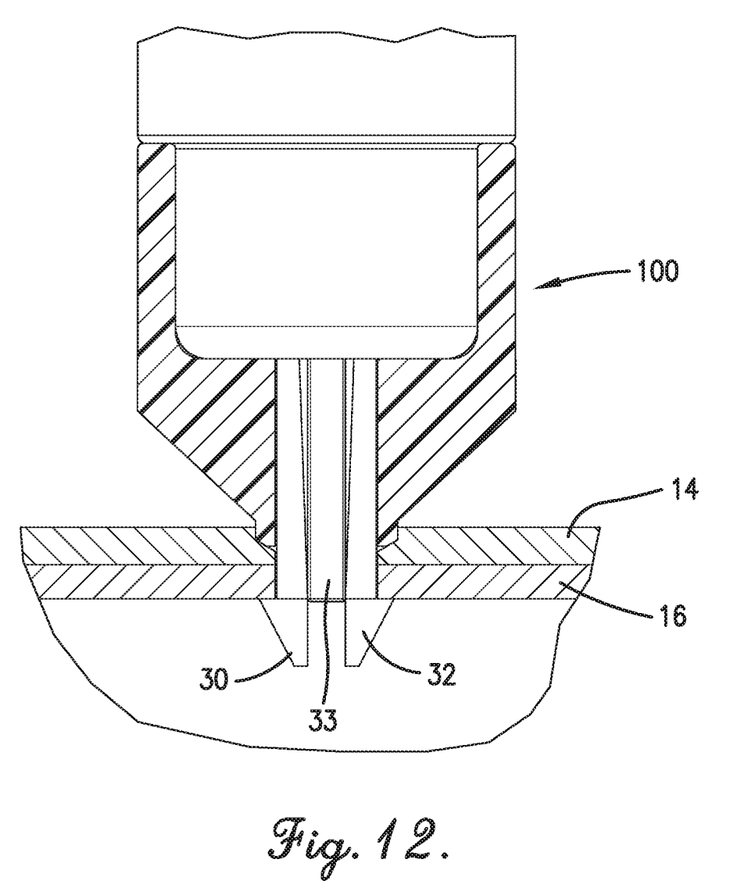
FIG. 12 is a fragmentary vertical sectional view of the cap of FIG. 4 installed on a temporary fastener that has been inserted in aligned holes in two workpieces after the hole in the outer workpiece has been countersunk.

The specific sizes, shapes, and properties of the cap 10 described above may be altered without departing from the scope of the invention. For example, a cap 100 constructed in accordance with a second embodiment of the invention is illustrated in FIGS. 4-6 and 12. The cap 100 is similar to the cap 10 but is specially configured for use with workpieces in which 120 degree flush shear head type rivet holes (e.g., for MS14218 rivets) commonly used on certain aircrafts are drilled. As with the cap 10, the cap 100 comprises a hollow, cup-shaped body 138 and an inwardly tapered neck 140. The hollow body 138 is essentially identical to the hollow body 38 of the cap 10 and therefore won't be described again. The inwardly tapered neck 140 is similar to the neck 40 of the cap 10 except it terminates in a vertically-extending flange 157 that tapers inwardly at its lower edge to form a tip 158 that is similar to the tip 58 but that is configured to correspond to and mate with a type 120 degree flush shear head countersunk hole as depicted in FIG. 12. Other embodiments of the cap, including caps of different sizes and shapes, may be configured for other sizes and types of rivet holes.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A cap configured to protect an outermost one of two or more workpieces having aligned holes from a temporary fastener configured to be inserted in the aligned holes to temporarily hold the two or more workpieces together, the outermost workpiece having a 120 degree flush shear head countersunk hole surface, the cap comprising:
   a hollow body configured to fit over a portion of the temporary fastener;
   an inwardly tapered neck extending from the hollow body; and
   a vertically extending flange forming a hollow tip sized and configured to contact a minimal exterior surface area of the outermost one of the workpieces, the inwardly tapered neck terminating at the vertically extending flange, the vertically extending flange including a lower edge and tapering inwardly at the lower edge at sixty degrees from a vertical axis to engage the 120 degree flush shear head countersunk hole surface.

2. The cap as set forth in claim 1, wherein the hollow tip has an external diameter no greater than 0.5 inches.

3. The cap as set forth in claim 1, wherein the hollow tip has an internal diameter of approximately 0.19 inches and an external diameter of approximately 0.24 inches.

4. The cap as set forth in claim 1, wherein the outermost workpiece includes a countersunk hole, the hollow tip being configured to be inserted into the countersunk hole.

5. The cap as set forth in claim 1, wherein the hollow body and the inwardly tapered neck are integrally formed via injection molding or three dimensional printing.

6. The cap as set forth in claim 1, wherein the inwardly tapered neck tapers inwardly relative to the hollow body at an angle of between 40 and 50 degrees from a vertical axis.

7. A cap configured to protect an outermost one of two or more workpieces having aligned holes from a temporary fastener configured to be inserted in the aligned holes to temporarily hold the two or more workpieces together, the outermost workpiece having a 120 degree flush shear head countersunk hole surface, the cap comprising:
   a hollow body configured to fit over a portion of the temporary fastener, the hollow body including an outer wall including an outer surface and an inner surface having an inner diameter;
   an inwardly tapered neck extending from the outer surface of the outer wall, the inwardly tapered neck tapering to a tapered diameter smaller than the inner diameter of the inner surface of the outer wall of the hollow body; and
   a vertically extending flange forming a hollow tip sized and configured to contact a minimal exterior surface area of the outermost one of the workpieces, the vertically extending flange including a lower edge and tapering inwardly at the lower edge at sixty degrees from a vertical axis to engage the 120 degree flush shear head countersunk hole surface.

8. The cap as set forth in claim 7, wherein the inwardly tapered neck tapers inwardly relative to the hollow body at an angle of between 40 and 50 degrees from a vertical axis.

9. A cap configured to protect an outermost one of two or more workpieces having aligned holes from a temporary fastener configured to be inserted in the aligned holes to temporarily hold the two or more workpieces together, the cap comprising:
   a hollow body configured to fit over a portion of the temporary fastener;
   an inwardly tapered neck extending inwardly from the hollow body at an angle of between 40 and 50 degrees from a vertical axis; and
   a vertically extending flange forming a hollow tip having an external diameter no greater than 0.5 inches to contact a minimal exterior surface area of the outermost one of the workpieces, the vertically extending flange including a lower edge and tapering inwardly at the lower edge at approximately 60 degrees from a vertical axis, the inwardly tapered neck terminating at the vertically extending flange,
   the hollow body, the inwardly tapered neck, and the vertically extending flange being integrally formed via injection molding or three dimensional printing.

* * * * *